United States Patent
Abdelhamid et al.

(10) Patent No.: US 7,466,981 B1
(45) Date of Patent: Dec. 16, 2008

(54) HANDING OFF A NODE FROM A FIRST ACCESS POINT TO A SECOND ACCESS POINT

(75) Inventors: Hisham S. Abdelhamid, San Jose, CA (US); Carlos V. Laux, San Ramon, CA (US); Marcio Guidorizzi de Siqueira, San Jose, CA (US); Jennifer K. Walker, Jackson, WY (US); Kamaldip S. Toor, San Diego, CA (US)

(73) Assignee: Cisco Technology, Inc., San Jose, CA (US)

( * ) Notice: Subject to any disclaimer, the term of this patent is extended or adjusted under 35 U.S.C. 154(b) by 448 days.

(21) Appl. No.: 11/259,570

(22) Filed: Oct. 25, 2005

(51) Int. Cl.
*H04L 12/40* (2006.01)

(52) U.S. Cl. .............. 455/438; 455/436; 455/437; 455/439; 455/442; 455/443; 455/444; 370/310; 370/331; 370/332; 370/333; 370/334; 370/338

(58) Field of Classification Search ............ 455/436, 455/437, 438, 439, 442, 443, 444, 450; 370/310, 370/331, 332, 333, 334, 338
See application file for complete search history.

(56) References Cited

U.S. PATENT DOCUMENTS

| | | | | |
|---|---|---|---|---|
| 5,175,867 A | * | 12/1992 | Wejke et al. .............. | 455/439 |
| 5,293,643 A | * | 3/1994 | Israelsson ................ | 455/437 |
| 5,310,356 A | * | 5/1994 | Obata et al. .............. | 439/169 |
| 5,396,541 A | * | 3/1995 | Farwell et al. ............ | 455/403 |
| 5,754,945 A | * | 5/1998 | Lin et al. ................ | 455/436 |
| 5,796,772 A | | 8/1998 | Smith et al. .............. | 375/200 |
| 5,875,186 A | | 2/1999 | Belanger et al. .......... | 370/331 |
| 6,044,271 A | * | 3/2000 | Findikli ................. | 455/436 |
| 6,154,652 A | * | 11/2000 | Park et al. ............... | 455/437 |
| 6,560,210 B1 | * | 5/2003 | Matusevich ............... | 370/331 |
| 6,631,263 B1 | * | 10/2003 | Corkery .................. | 455/436 |
| 6,801,772 B1 | | 10/2004 | Townend et al. ........... | 455/436 |
| 6,917,772 B2 | | 7/2005 | Hoshika .................. | 399/49 |
| 7,299,019 B1 | * | 11/2007 | Austin et al. ............ | 455/161.3 |
| 2005/0128988 A1 | | 6/2005 | Simpson et al. ........... | 370/338 |

OTHER PUBLICATIONS

Pending U.S. Appl. No. 11/258,925, entitled "Identifying One Or More Access Points In One Or More Channels To Facilitate Communication," by Hisham S. Abdelhamid, et al., 42 pages plus 3 pages of drawings, filed Oct. 25, 2005.

(Continued)

*Primary Examiner*—Stephen M D'Agosta
(74) *Attorney, Agent, or Firm*—Baker Botts L.L.P.

(57) ABSTRACT

Handing off a node from a first access point to a second access point includes facilitating communication between a node and a network using a first access point. A handoff rule of one or more handoff rules is accessed. One or more handoff factors associated with the first access point and a second access point are determined. A handoff factor is relevant in deciding whether to handoff from the first access point to the second access point. The handoff rule is applied to the one or more handoff factors. Handoff of the node to the second access point is initiated if the one or more handoff factors satisfy the applied handoff rule.

19 Claims, 3 Drawing Sheets

OTHER PUBLICATIONS

PCT Notification of Transmittal of the International Search Report and the Written Opinion of the International Searching Authority, or the Declaration with attached PCT International Search Report and Written Opinion of the International Searching Authority in International Application No. PCT/US 06/38011, dated Oct. 9, 2007, 7 pages.

Cisco Wireless IP Phone 7920, Version 2.0, Data Sheet, Cisco Systems, Inc., © 2005 Cisco Systems, Inc., 7 pages.

QBone Scavenger Service (QBSS), http://qbone.internet2.edu/qbss, 5 pages, printed Jun. 30, 2005.

IEEE 802.11, http://en.wikipedia.org/wiki/IEEE_802.11, 8 pages, printed Jun. 30, 2005.

Pending Patent Application entitled, *"Identifying One Or More Access Points In One Or More Channels To Facilitate Communication"*, 42 pages specification, claims and abstract, 3 pages of drawings, inventors Hisham S. Abdelhamid, et al., filed Oct. 25, 2005.

* cited by examiner

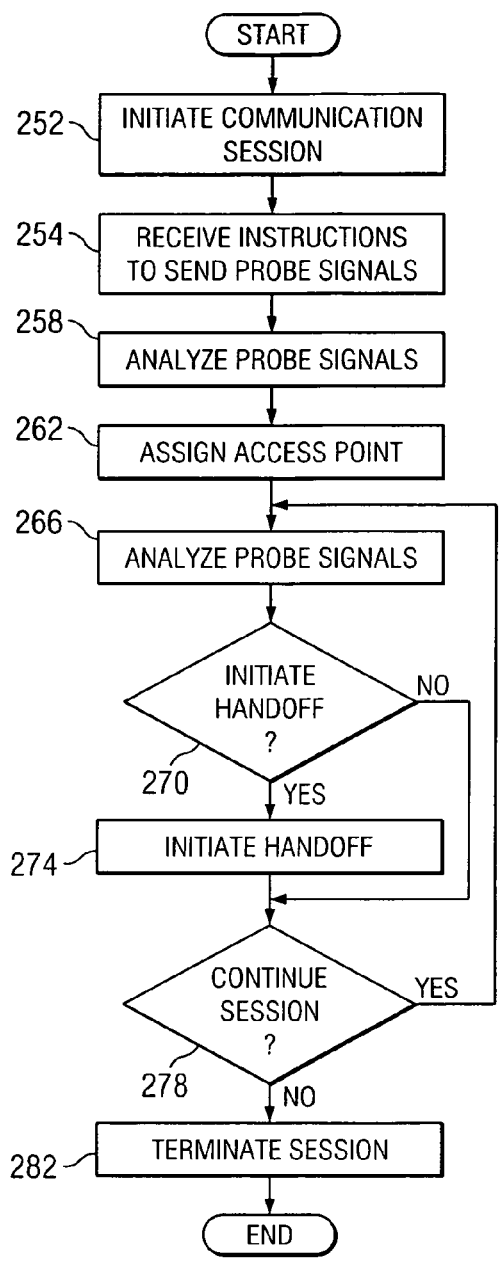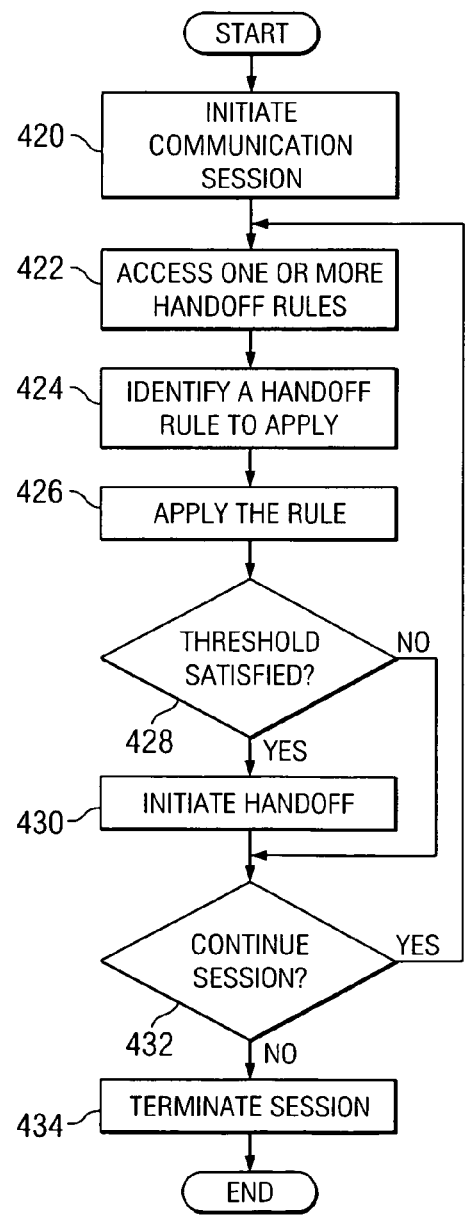

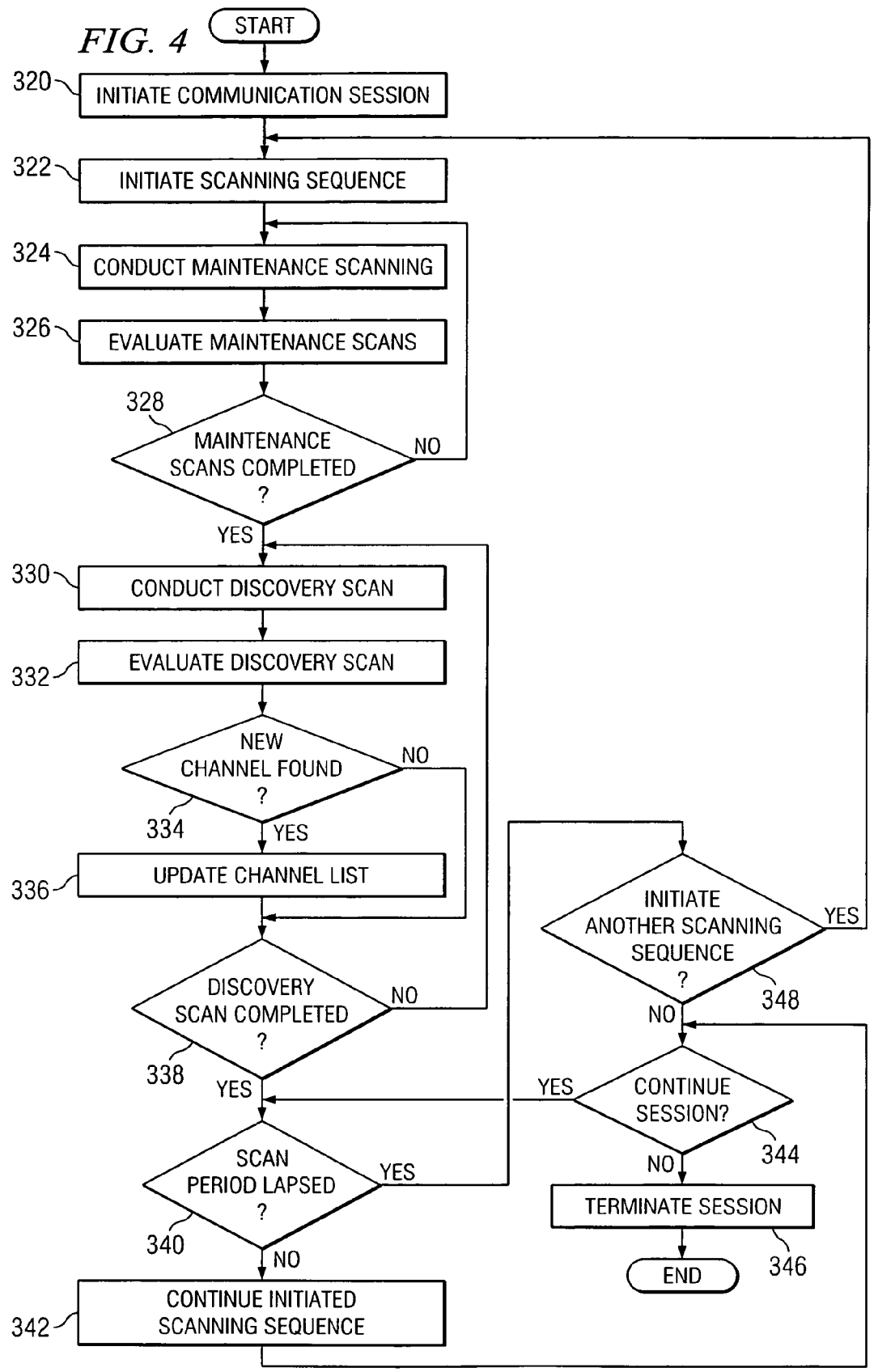

HANDING OFF A NODE FROM A FIRST ACCESS POINT TO A SECOND ACCESS POINT

TECHNICAL FIELD

This invention relates generally to the field of telecommunications and more specifically to handing off a node from a first access point to a second access point.

BACKGROUND

Nodes such as handsets may communicate with a wireless network through access points. The access points and the nodes may communicate with each other over a number of channels. Known techniques manage certain aspects of the communication. As an example, the communication channel may be selected to reduce interference. As another example, the access point may be changed as the node moves through the network. Known techniques for managing the communication between nodes and access points, however, may not be satisfactory in certain situations.

SUMMARY OF THE DISCLOSURE

In accordance with the present invention, disadvantages and problems associated with previous techniques for managing a handoff process may be reduced or eliminated.

According to one embodiment of the present invention, handing off a node from a first access point to a second access point includes facilitating communication between a node and a network using a first access point. A handoff rule of one or more handoff rules is accessed. One or more handoff factors associated with the first access point and a second access point are determined. A handoff factor is relevant in deciding whether to handoff from the first access point to the second access point. The handoff rule is applied to the one or more handoff factors. Handoff of the node to the second access point is initiated if the one or more handoff factors satisfy the applied handoff rule.

Certain embodiments of the invention may provide one or more technical advantages. A technical advantage of one embodiment may be that a node manages roaming decisions to access points using non-standard methods. The methods provide for roaming to another access point to enhance handset voice performance, system performance, and reduce power consumption. Accordingly, the node experiences better performance during communication.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 3 is a flowchart illustrating one embodiment of a method for assigning an access point to a node by using a centralized controller;

FIG. 4 is a flowchart illustrating one embodiment of a method for identifying channels available to a node using a scanning engine; and FIG. 5 is a flowchart illustrating one embodiment of a method for applying optimized handoff decisions to a node.

DETAILED DESCRIPTION OF THE DRAWINGS

Embodiments of the present invention and its advantages are best understood by referring to FIGS. 1 through 5 of the drawings, like numerals being used for like and corresponding parts of the various drawings.

Figure 1:
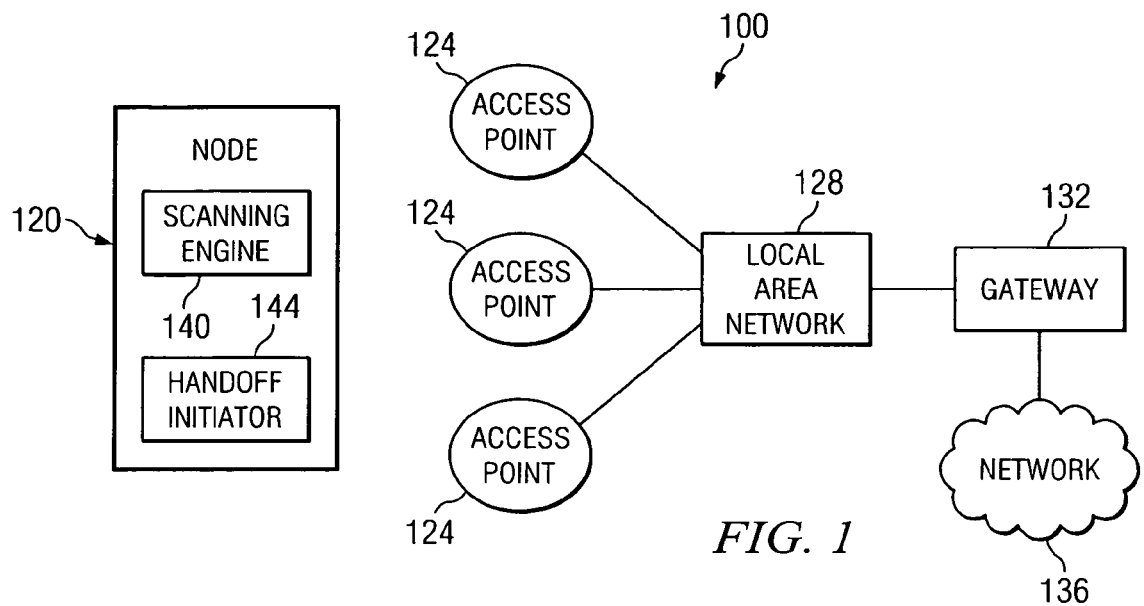
FIG. 1 is a block diagram illustrating a system that includes one embodiment of a node that manages communication between the node and an access point.
Figure 2:
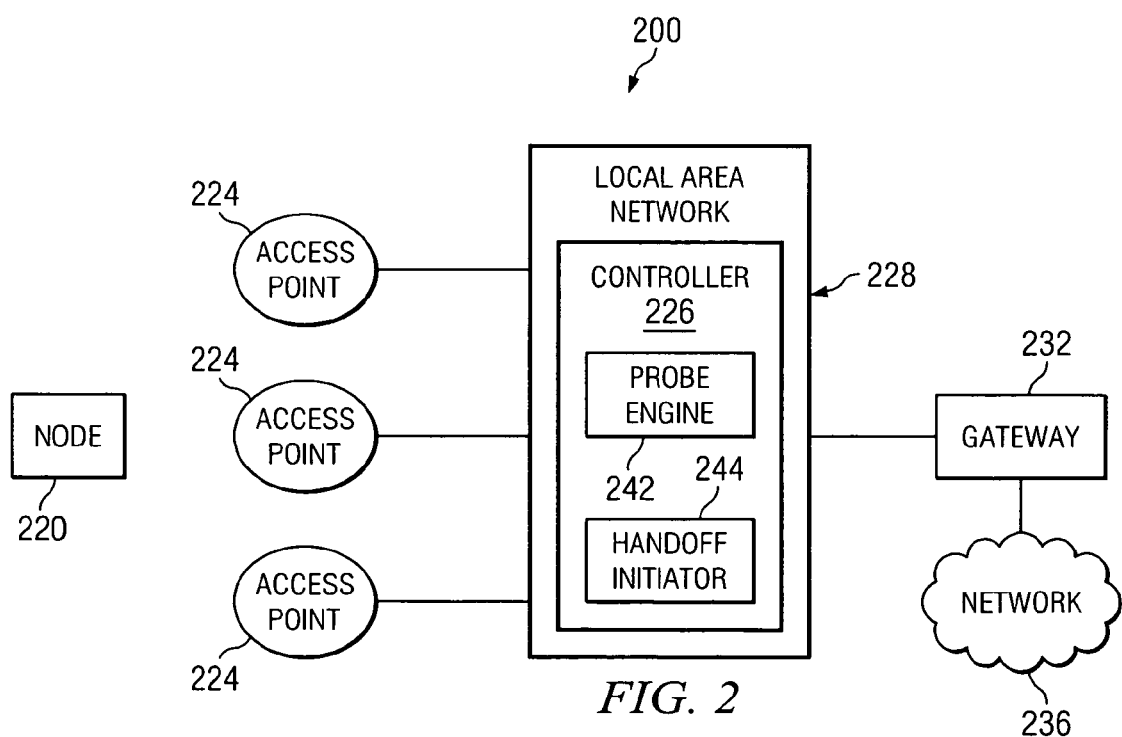
FIG. 2 is a block diagram illustrating a system that includes one embodiment of a centralized controller that manages communication between a node and access points.

FIGS. 1 and 2 illustrate example embodiments of systems that may be used to manage communication between a node and an access point of a local area network. FIG. 1 illustrates a system that includes an example node that manages the communication, and FIG. 2 illustrates a system that includes an example centralized controller that manages the communication.

Referring to FIG. 1, FIG. 1 is a block diagram illustrating a system 100 that includes one embodiment of a node 120 that manages communication between node 120 and an access point 124 of a local area network 128. According to one embodiment, node 120 may perform scans to discover and maintain communication channels. According to another embodiment, node 120 may initiate a handoff process.

System 100 operates to provide services such as communication sessions to an endpoint such as node 120. A communication session may refer to an active communication between endpoints, measured from endpoint to endpoint. Information is communicated during a communication session. Information may refer to voice, data, text, audio, video, multimedia, control, signaling, other information, or any combination of the preceding. The information may be communicated in packets. A packet may comprise a bundle of data organized in a specific way for transmission, and a frame may comprise the payload of one or more packets organized in a specific way for transmission. A packet-based communication protocol such as Internet Protocol (IP) may be used to communicate the packets.

System 100 may utilize communication protocols and technologies to provide the communication sessions. Example communication protocols and technologies include those set by the Institute of Electrical and Electronics Engineers, Inc. (IEEE) standards, International Telecommunications Union (ITU-T) standards, European Telecommunications Standards Institute (ETSI) standards, Internet Engineering Task Force (IETF) standards, or other standards. As an example, system 100 may utilize the IEEE 802.xx standards such as the 802.11 standards.

According to the illustrated embodiment, system 100 includes node 120 and a set of access points 124 coupled as shown. Node 120 represents any suitable communication device operable to communicate with local area network 128 through access point 124. In general, a device may include any suitable arrangement of components operable to perform the operations of the device, and may comprise logic. "Logic" may refer to hardware, software, other logic, or any suitable combination of the preceding.

Node 120 may comprise, for example, a personal digital assistant, a computer such as a laptop, a cellular telephone, a mobile handset, or any other device operable to communicate with local area network 128 through access point 124. A node 120 may have a node identifier that uniquely identifies node 120. As an example, a node identifier of a node 120 may comprise the media access control (MAC) address of the node 120.

Access point 124 provides wireless services to a node 120 present in the coverage area of access point 124. An access point may refer to a network point that couples a wireless device, such as node 120, to a wired network, such as local area network 128. Access point 124 may comprise any suitable logic operable to provide wireless services. According to one embodiment, access point 124 includes a receiver or transmitter or both a receiver and a transmitter. As an example, access point 124 may include an omni-directional antenna operable to communicate with one or more nodes 120. Access point 124 may have an access point identifier that uniquely identifies access point 124. As an example, an access point identifier of an access point 124 may comprise the media access control (MAC) address of the access point 124.

In general, nodes communicate with access points over channels using any suitable protocol. A channel may refer to a communication link with a specific frequency band. According to one embodiment, nodes may communicate with access points using protocols defined in the IEEE 802.11 standards, such as the 802.11b, 802.11g, and 802.11a standards.

The 802.11b and 802.11g standards operate in the unlicensed 2.4 gigahertz (GHz) band. The 802.11b and 802.11g standards divide the band into 14 overlapping, staggered channels with center frequencies that are 5 megahertz (MHz) apart. The 802.11b and 802.11g standards specify the center frequency of each channel and a spectral mask for each channel. The spectral mask for 802.11b may require that the signal be at least 30 dB down from its peak energy at +11 MHz from the center frequency and at least 50 decibels (dB) down from its peak energy at ±22 MHz from the center frequency.

The 802.11a standard operates in the 5 GHz band. The band is divided into 12 non-overlapping channels. Eight of the channels are dedicated to indoor use, and four of the channels are dedicated to point-to-point use. The 802.11a standard uses an orthogonal frequency-division multiplexing (OFDM) process with 52 subcarriers. Forty-eight subcarriers are data subcarriers, and 4 subcarriers are pilot subcarriers with a carrier separation of 0.3125 MHz (20 MHz/64). The total bandwidth is 20 MHz with an occupied bandwidth of 16.6 MHz.

As an example, node 120 may be designed to operate in the following three Unlicensed National Information Infrastructure (UNNI) channel bands:

Lower: 36, 40, 44, 48 at 40 milliwatts;

Middle: 52, 56, 60, 64 at 200 milliwatts; and

Upper: 149, 153, 157, 161 at 800 milliwatts.

The upper channel band may be reserved for outdoor applications, and the middle and lower channel bands may be reserved for indoor use.

In general, different access points may communicate over different designated channels, and a node communicates with an access point over its designated channel. Typically, channels that are available to a node need to be identified in order for the node to communicate over the channels. Moreover, as a node moves through a network, a handover process may be performed between access points. As a node moves from the coverage area of a first access point to the coverage area of a second access point, the first access point hands over the communication session to the second access point. Typically, the point at which a handoff process is to be initiated needs to be established.

According to the illustrated embodiment, node 120 includes modules, such as a scanning engine 140 and a handoff initiator 144 that may be used to manage communication between node 120 and access point 124.

Scanning engine 140 identifies channels available to node 120. The channels may be identified by performing scans to determine the channels of access points 124 that can communicate with node 120. A scan may be performed in between sending packets, and a scan period may have any suitable duration. As an example, a scan period may have a duration of approximately 1 to 5 seconds, for example, approximately 2 to 3 seconds. Scanning engine 140 may use any suitable method for performing scans. An example method is described with reference to FIG. 4.

The scans include discovery scans and maintenance scans. Discovery scans are performed to discover channels of a frequency range previously unknown to node 120. Maintenance scans are performed to discover channels of a known frequency range. According to one embodiment, more maintenance scans may be performed than discovery scans. That is, maintenance scans may be performed X % of the time, while discovery scans may be performed Y % of the time, where X is much greater than Y. As an example, maintenance scans may be performed over 70 to 80% of the time, for example, approximately 90% of the time. According to other embodiments, however, Y may be greater than or equal to X. According to one embodiment, scanning engine 140 may scan channels infrequently, and then scan channels more frequently in response to a discovery.

According to one embodiment, node 20 may operate in a current channel of a current frequency range, while scanning engine 140 performs scans to discover other channels in the current frequency range or outside of the current frequency range. As an example, node 120 may operate in the 802.11a frequency range, while scanning engine 140 performs scans in the 802.11b/802.11g frequency range. Conversely, node 120 may operate in the 802.11b/802.11g. frequency range, while scanning engine 140 performs scans in the 802.11a frequency range.

Information about the scanned channels may be stored in a data structure such as a table. The data structure may include any suitable information. As an example, the data structure may include priority A, B, and C lists. A priority A list may include channels that are known to node 120. A priority B list may include unknown channels that are within the current frequency range. A priority C list includes unknown channels that are outside of the current frequency band. The priority C list may include channels in the A band if the phone is in the G mode, and vice-versa. The frequency of scans of channels of priority A list may be increased if the number of deployed channels is above a threshold.

Handoff initiator 144 determines the point at which a handoff process is to be initiated. Handoff initiator 144 may use any suitable method for determining when to initiate the handoff process. Example methods are described with reference to FIG. 5.

According to the illustrated embodiment, system 100 also includes a local area network 128, a gateway 132, and a wide area network 136 coupled as shown. Local area network 128 represents a communications network that couples communication devices within a limited region such as a building or campus. Typically, devices of a local area network may communicate with each other by transmitting information directly to each other without transmitting the information outside of the network.

Gateway 132 represents any suitable device operable to interconnect with network 128. Gateway 132 may convert communications between different communication protocols. For example, gateway 132 may convert communications from a protocol used by network 128 to a different protocol, or vice-versa.

Network 136 represents a communication network that allows devices such as node 120 to communicate with other devices. A communication network may comprise all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding.

One or more components of system 100 may operate on one or more computers and may include appropriate input devices, output devices, mass storage media, processors, memory, or other components for receiving, processing, storing, and communicating information according to the operation of system 100. As used in this document, the term "computer" refers to any suitable device operable to accept input, process the input according to predefined rules, and produce output, for example, a personal computer, work station, network computer, wireless telephone, handset, personal digital assistant, one or more microprocessors within these or other devices, or any other suitable processing device.

As an example, one or more components of system 100 may include logic, an interface, memory, other component, or any suitable combination of the preceding. Certain logic may manage the operation of a device, and may comprise, for example, a processor. "Processor" may refer to any suitable device operable to execute instructions and manipulate data to perform operations. "Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

Modifications, additions, or omissions may be made to system 100 without departing from the scope of the invention. The components of system 100 may be integrated or separated according to particular needs. Moreover, the operations of system 100 may be performed by more, fewer, or other modules. For example, the operations of scanning engine 140 and handoff initiator 144 may be performed by one module, or the operations of scanning engine 140 may be performed by more than one module. Additionally, operations of system 100 may be performed using any suitable logic. As used in this document, "each" refers to each member of a set or each member of a subset of a set.

Referring to FIG. 2, FIG. 2 is a block diagram illustrating a system 200 that includes one embodiment of a centralized controller 226 that manages communication between a node 220 and access points 224 of a local area network 228. According to the embodiment, controller 226 may initiate a handoff process.

According to the illustrated embodiment, system 200 includes a node 220, a set of access points 224, a local area network 228, a gateway 232, and a wide area network 236 coupled as shown. Node 220 represents any suitable communication device operable to communicate with local area network 228 through access point 224. Node 220 may comprise, for example, a personal digital assistant, a computer such as a laptop, a cellular telephone, a mobile handset, or any other device operable to communicate with local area network 228 through access point 224. According to the embodiment, node 220 may include a scanning engine substantially similar to scanning engine 140 of FIG. 1. Access point 224 provides wireless services to node 220 present in the coverage area of access point 224, and may be substantially similar to access point 124 of FIG. 1.

Local area network 228 represents a communications network that couples communication devices within a limited region such as a building or campus. According to the illustrated embodiment, local area network 228 includes centralized controller 226 that manages communication between node 220 and access points 224.

Centralized controller 226 manages a handoff process. According to the illustrated embodiment, controller 226 includes a probe engine 242 and a handoff initiator 244. Probe engine 242 analyzes probe signals sent from node 220. According to one embodiment, probe engine 242 instructs node 220 to periodically send probe signals over different channels to access points 224 within the coverage area of node 220. A probe signal advertises the node identifier of node 220, and may comprise a frame of a short duration. The instructions may be sent using any suitable communication technique, for example, a unicast technique.

The instructions may have any suitable format. According to one embodiment, the instructions may include probe parameter values for probe parameters that describe deployment of the probe signals. The probe parameters may describe any suitable aspect. As an example, the probe parameters may designate the specific channels or a specific sequence of channels on which to send the probe signals. The channels may include, for example, channels adjacent to the current channel. As another example, the probe parameters may specify the timing, such that the period or rate, of transmittal for the probe signals. Other probe parameters may designate a service set identifier (SSID), encryption keys, other aspect, or any combination of the preceding.

The probe signals are received by access points 224, and are analyzed by probe engine 242. As an example, probe engine 242 may compare the relative signal strength of the probe signals in order to make handoff decisions. If the signal strength at the first access point 224 is lower than the signal strength at the second access point 224, probe engine 242 may initiate a handoff process from the first access point 224 the second access point 224. Probe engine 242, however, may analyze the probe signals in any other suitable manner. For example, probe engine 242 may also utilize channel utilization, call slot availability, or transmission failures of access points 224 to make handoff decisions.

Handoff initiator 244 determines the point at which a handoff process is to be initiated. Handoff initiator 244 may use any suitable method for determining when to initiate the handoff process. As an example, handoff initiator 244 may initiate a handoff in response to a handoff decision from probe engine 242. Other example methods are described with reference to FIG. 5.

Gateway 232 represents any suitable device operable to interconnect with network 228, and may be substantially similar to gateway 132 of FIG. 1. Network 236 represents a communication network that allows devices such as node 220 to communicate with other devices, and may be substantially similar to network 136 of FIG. 1.

One or more components of system 200 may operate on one or more computers and may include appropriate input devices, output devices, mass storage media, processors, memory, or other components for receiving, processing, storing, and communicating information according to the operation of system 200. As an example, one or more components of system 200 may include logic, an interface, memory, other component, or any suitable combination of the preceding. Certain logic may manage the operation of a device, and may comprise, for example, a processor.

Modifications, additions, or omissions may be made to system 200 without departing from the scope of the invention. The components of system 200 may be integrated or separated according to particular needs. Moreover, the operations of system 200 may be performed by more, fewer, or other modules. For example, the operations of controller 226 may be performed by more than one module. Additionally, operations of system 200 may be performed using any suitable logic.

FIG. 3 is a flowchart illustrating one embodiment of a method for identifying access points in channels available to a node according to instructions from a centralized controller. The method may be particularly useful in applications where access points 224 can listen at all times. The method may be used by any suitable system, such as system 200 of FIG. 2.

The method starts at step 250, where a communication session is initiated between node 220 and network 228. Node 220 receives instructions from controller 226 to send probe signals at step 254. The instructions may include probe parameter values defining deployment of the probe signals. For example, the probe parameter values may designate a particular sequence of channels on which to send the probe signals.

According to one embodiment, node 220 may send the probe signals according to modes of node 220. As an example, node 220 may have an idle mode, a voice mode, and an out-of-range mode. In the idle mode, node 220 synchronizes the probe signals to delivery traffic indication messages (DTIM) of the associated access points 224 before the probe signals are sent. In the voice mode, node 220 sends the probe signals in between packets. In the out-of-range mode, node 220 uses an internal process to discover the serving network.

The probe signals are received from node 220, and controller 226 analyzes the probe signals at step 258. Controller 226 may analyze the relative signal strength of the probe signals, or channel utilization, call slot availability, or transmission failures of access points 224. In response to the analysis, controller 226 assigns an access point 224 to node 220 at step 262.

The session may be continued at step 264. If the session is to be continued, the method proceeds to step 226, where controller 226 analyzes additional probe signals received from node 220. A handoff process may be initiated at step 270. If a handoff process is to be initiated at step 270, the method proceeds to step 274, where the handoff process is initiated. If the handoff process is not to be initiated at step 270, the method returns to step 264 to determine whether the session is to be continued. If the session is not to be continued at step 264, the method proceeds to step 282, where the communication session is terminated. After the session is terminated, the method ends.

Modifications, additions, or omissions may be made to the method without departing from the scope of the invention. The method may include more, fewer, or other steps. Additionally, steps may be performed in any suitable order without departing from the scope of the invention.

FIG. 4 is a flowchart illustrating one embodiment of a method for identifying access points in channels available to a node using a scanning engine. The method may be used by any suitable system, such as system 100 of FIG. 1.

The method starts at step 320, where a communication session is initiated between node 120 and network 128. The initiated session may be previously saved channel information, a static default configuration, or any other suitable session. Node 120 initiates a scanning sequence to identify access points 124 in channels at step 322 and attempts to connect to an access point 124. When node 120 attempts to connect to access point 124, maintenance scanning and discovery scanning occur during the scanning sequence.

At step 324, node 120 conducts maintenance scanning. Maintenance scanning allows node 120 to find some or all access points 124 in channels that are known to node 120. For example, if node 120 uses the 802.11a standard to communicate and operates in the upper UNNI channel band, maintenance scanning involves finding access points 124 in channels known to node 120 in the upper UNNI channel band of the 5 GHz frequency band. The maintenance scans are evaluated at step 326. The maintenance scans may be completed at step 328. In an embodiment, maintenance scans may occur more often than discovery scans during a scanning sequence. For example, maintenance scans may occur 90% of the time, while discovery scans occur 10% of the time. In another embodiment, the percentage of maintenance scans to discovery scans may be dynamic. For example, the percentage is preconfigured in the initial state and the percentage changes as the scans are performed. Maintenance scans may be regarded as completed when a certain amount of time has lapsed, a certain number of scans has occurred, or any other suitable measure of scan completion has been reached. Node 120 returns to step 324 to continue maintenance scanning if the scanning is not complete.

If the maintenance scanning has been completed, node 120 conducts discovery scanning at step 330. Discovery scanning allows node 120 to find access points 124 in unknown channels, in different channel bands, or in different frequency bands. For example, if node 120 uses the 802.11a standard to communicate and operates in the upper UNNI band, node 120 may discover access points 124 in unknown channels in the upper UNNI band of the 5 GHz frequency band, in channels in the lower or middle UNNI bands of the 5 GHz frequency band, or in channels in the lower, middle, or upper UNNI bands of the 2.4 GHz frequency band. The discovery scans are evaluated at step 332. While evaluating the discovery scans, a new channel may be found at step 334. If a new channel is found, node 120 updates a channel list at step 336. The channel list includes possible channels that node 120 may use to participate in the communication session. If a new channel is not found, the method proceeds to step 338 to determine if the discovery scans have been completed. Discovery scans may be regarded as completed when a certain amount of time has lapsed, a certain number of scans has occurred, or any other suitable measure of scan completion has been reached. If the scans have not been completed, the method returns to step 330 to continue conducting discovery scans. If the discovery scans have been completed, the method proceeds to step 340.

Node 120 determines whether the scan period has lapsed at step 340. A scan period may have any suitable duration, such as a duration of approximately 2 to 3 seconds. If the scan period has lapsed at step 340, node 120 decides at step 348 whether to initiate another scanning sequence. Maintenance scanning may be initiated periodically, for example, every two seconds, because node 120 maintains information on channels that are known in a particular session. Discovery scanning may be initiated by a periodic timer, for example, a timer is triggered every six seconds. Node 120 initiates another scanning sequence at step 322 if it decides to initiate another scanning sequence. If node 120 decides not to initiate another scanning sequence, the method proceeds to step 344. If the scan period has not lapsed at step 340, node 120 continues the initiated scanning sequence at step 342.

Node 120 determines whether to continue the communication session at step 344. If node 120 decides to continue the session, the method returns to step 340 to determine if the scan period of the scanning sequence has elapsed. Node 120 terminates the session at step 346 if it decides not to continue the session. After the session terminates, the method ends.

Modifications, additions, or omissions may be made to the method without departing from the scope of the invention. The method may include more, fewer, or other steps. For example, node 120 may not determine whether the scan period has lapsed, but may automatically initiate another scanning sequence upon updating the channel list. Additionally, steps may be performed in any suitable order without departing from the scope of the invention. For example, maintenance scanning and discovery scanning may occur in parallel instead of sequentially.

FIG. 5 is a flowchart illustrating one embodiment of a method for applying optimized handoff decisions to a node. The method may be used by any suitable system, such as system 200 of FIG. 2.

The method begins at step 420, where a communication session is initiated between node 220 and network 228. During the communication session, node 220 may roam between access points 224 if controller 226 instructs handoff initiator 244 to initiate a handoff. Controller 226 accesses one or more handoff rules in handoff initiator 244 at step 422. A handoff rule allows handoff initiator 244 to determine whether to handoff node 220 from a current access point 224 to a new access point 224.

Controller 226 may use any suitable handoff rule within handoff initiator 244 to optimize handoff decisions applied to node 220. In one embodiment, handoff initiator 244 includes one or more of the following rules to determine when to handoff a call: a Received Signal Strength Indicator (RSSI) rule, a channel utilization differential rule, a consecutive transaction failures rule, and a slot availability rule. Each rule may have an associated handoff factor that the handoff initiator 244 uses in applying the handoff rule. A handoff factor may be relevant to decide whether to handoff from the current access point 224 to the new access point 224. For example, RSSI is the handoff factor of the RSSI rule, channel utilization is the handoff factor of the channel utilization differential rule, transaction failures are the handoff factors of the consecutive transaction rule, and available slots are the handoff factors of the slot availability rule.

RSSI Rule

An RSSI indicates the strength of a signal from access point 224 as measured by node 220. In an embodiment, the signal strength may be normalized from 1 to 100. An RSSI difference (RSSI_DIFF) indicates the difference between the RSSI of the new access point 224 (new RSSI) and the RSSI of the current access point 224 (current RSSI) and may be defined as RSSI_DIFF=(new RSSI)−(current RSSI).

The decision to handoff is dynamic and is based on the RSSI difference. Handoff initiator 244 may handoff node 220 from the current access point 224 to the new access point 224 if the RSSI difference satisfies a differential threshold. The RSSI differential threshold may be used to determine when to handoff a call based on the RSSI difference.

In an embodiment, if the current RSSI is lower, then it may be more likely that the RSSI may be improved if node 220 roams. Moreover, if the current RSSI is higher, then the current RSSI may be satisfactory for communication. Accordingly, the thresholds that trigger roaming may be adjusted in accordance with the current RSSI. For example, the differential threshold that triggers a handoff may be lower when the current RSSI is lower, and may be higher when the current RSSI is higher. For example, in an 802.11b band, when the current RSSI is less than 30, the differential threshold may be 5. When the current RSSI is in a range between 30 but less than 40, the differential threshold may be 10. When the current RSSI is in a range between 40 but less than 50, the differential threshold may be 15. When the current RSSI is greater than 50, the differential threshold may be 100.

Any suitable averaging technique of RSSI values may also be used as the RSSI rule. For example, weighted averaging non-linear filters and/or weighted averaging time-varying filters may be used. In an embodiment, multiple averaging techniques may be applied. For example, the highest or lowest value of the techniques may be used as the RSSI value. In certain cases, standard averaging of RSSI values might not provide a stable RSSI measurement on which to base a handoff decision because RSSI values may vary dramatically depending on channel conditions, such as non-permanent interference. The unstable measurements may trigger an unnecessary or false roam, or may cause thrashing between access points 224.

Applying the weighted averaging technique of RSSI values involves taking an average of the RSSI samples, where the current samples are given a greater weight. Any suitable weighted averaging technique may be used. As an example, handoff initiator 244 takes the highest of either the current RSSI sample or the weighted average of a number of samples to determine whether to initiate handoff. For example, the weighted average of five recent samples may be used to determine whether to initiate handoff. As an example equation, RSSI_Average(k)=MAX of {RSSI(k) or $\frac{1}{15}$[5*RSSI(k)+4*RSSI(k−1)+3*RSSI(k−2)+2*RSSI(k−3)+RSSI(k−4)]}. The above equation determines the average of RSSI values as the maximum of the following: a current RSSI sample or the weighted average of five recent RSSI samples. The weighted average gives more weight to more current samples by multiplying the more current values by an integer. For example, in the above equation, the current RSSI value [RSSI(k)] is multiplied by 5, while the RSSI value determined immediately before the current RSSI value [RSSI(k−1)] is multiplied by 4.

Channel Utilization Differential Rule

Channel utilization may be advertised by access points using a Quality of Service (QoS) Basis Service Set (QBSS) element defined in the 802.11e standard. The QBSS element contains a field that advertises channel utilization. The 802.11e standard assigns values for QBSS in the range of 0 to 255. A busier channel has a higher QBSS, and a less busy channel has a lower QBSS. Since QBSS is an absolute number, it can be normalized from 0 to 100. A channel utilization difference represents the difference between the channel utilization of a new access point 224 (new channel utilization) and the channel utilization of a current access point 224 (current channel utilization). A channel utilization differential threshold may be used to determine when to handoff a call based on the channel utilization difference.

If the current channel utilization is higher, then it may be more likely to find an access point 224 with lower channel utilization if node 220 roams. Moreover, if the current channel utilization is lower, then the channel utilization may be satisfactory for communication. Accordingly, if the current channel utilization is higher, the channel utilization differential threshold may be lower. Conversely, if the current channel utilization is lower, the channel utilization differential threshold may be higher.

As an example, handoff initiation may occur according to the following levels of channel utilization differential thresholds: if the current channel utilization is less than 30, the differential threshold is 30; if the current channel utilization is in a range between 30 and 40, the differential threshold is 25; if the current channel utilization is in a range between 40 and 50, the differential threshold is 20; and if the current channel utilization is greater than 50, the differential threshold is 15. Additional or other suitable levels of channel utilization differential thresholds may be used to initiate handoff of node 220. For example, in addition to the ranges of differential thresholds, handoff also may be based on the maximum threshold configured for the channel.

Consecutive Transaction Failures Rule

A transaction failure may refer to an attempt to transmit packets without acknowledgement from an access point 224. Consecutive transaction failures may initiate a handoff of node 220 between access points 224. A consecutive transaction failure threshold may be used to determine when to initiate a handoff. Handoff initiator 244 may use any suitable consecutive transaction failure threshold, such as a number of failures in the range of two through six failures. For example, if the consecutive transaction failure threshold is three failures, the handoff may occur if three failed transmissions occur consecutively.

Slot Availability Rule

Access point 224 includes slots to handle calls as they become active. If a call becomes active and the current access point 224 does not have available slots, handoff initiator 244 may trigger a handoff of node 220 to another access point 224 that has a threshold of slots available. In an embodiment, node 220 and access point 224 perform a Layer 2 call admission control procedure. Node 220 sends a transmission request to access point 224 based on an indication that there may be available slots and access point 224 responds to the request by accepting or rejecting the call flow.

Access point 224 may use any suitable procedure to determine how many additional calls access point 224 may admit. For example, access point 224 may track the percentage of channel busy time and the transmission time of downlink and uplink voice packets. A channel bandwidth requirement may be determined from the percentage of channel busy time, and a voice packet queuing requirement may be determined from the transmission time of downlink and uplink voice packets. Access point 224 may calculate the number of admissible calls from the channel bandwidth requirement and the voice packet queuing requirement.

If access point 224 does not have available slots, handoff initiator 244 triggers a handoff to associate node 220 with another access point 224 available to take the call. The available admission capacity is monitored in addition to other handoff rules in handoff initiator 244 to determine if an early handoff should be done. For example, handoff initiator 244 may consider slot availability and the availability of good signal strength according to a RSSI rule or the channel utilization differential rule.

Upon accessing the one or more handoff rules, controller 226 identifies a handoff rule to apply at step 424. Controller 226 applies the identified rule at step 426. For example, if controller 226 decides to use the channel utilization differential rule, controller 226 evaluates the handoff factor, the channel utilization, of access points 224 to determine whether a new access point 224 has a low enough channel utilization to trigger handoff of node 220 from the current access point 224.

At step 428, controller 226 determines whether the threshold is satisfied. Using the above example, if node 220 uses a channel with a channel utilization that is less than 30, the channel utilization differential threshold should be at least 30 to satisfy the threshold. If the threshold is satisfied, controller 226 initiates handoff to another access point 224 at step 430, and the method then proceeds to step 432. If the threshold is not satisfied, the method proceeds directly to step 432.

Node 220 decides whether to continue the communication session at step 432. If the session is to be continued, the method returns to step 422 where controller 226 continues monitoring the session and accessing rules to determine if a handoff is appropriate. If the session is not be continued, the session is terminated at step 434. After the session is terminated, the method ends.

Modifications, additions, or omissions may be made to the method without departing from the scope of the invention. For example, controller 226 may apply more than one rule to a communication session, or may prioritize the rules for a communication session. The method may include more, fewer, or other steps. Additionally, steps may be performed in any suitable order without departing from the scope of the invention.

Certain embodiments of the invention may provide one or more technical advantages. A technical advantage of one embodiment may be that a node manages roaming decisions to access points using non-standard methods. The methods provide for roaming to another access point to enhance handset voice performance, system performance, and reduce power consumption. Accordingly, the node experiences better performance during communication.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for handing off a node from a first access point to a second access point, comprising:
    facilitating communication between a node and a network using a first access point;
    accessing a handoff rule of one or more handoff rules;
    determining one or more handoff factors associated with the first access point and a second access point, a handoff factor relevant in deciding whether to handoff from the first access point to the second access point;
    applying the handoff rule to the one or more handoff factors by:
        determining a difference between a first Received Signal Strength Indicator (RSSI) value and a second RSSI value, the first RSSI value associated with the first access point, the second RSSI value associated with the second access point; and
    initiating handoff of the node to the second access point if the one or more handoff factors satisfy the applied handoff rule by:
        initiating handoff of the node to the second access point if the difference satisfies an RSSI differential threshold, the RSSI differential threshold comprising a first RSSI differential threshold if the first RSSI value is within a first range of values, the RSSI differential threshold comprising a second RSSI differential threshold if the first RSSI value is within a second range of values, the first range of values less than the second range of values, the first RSSI differential threshold less than the second RSSI differential threshold.

2. The method of claim 1, further comprising determining the first RSSI value by:
   applying an averaging technique to a plurality of RSSI values;
   determining an average of the applied averaging technique; and
   establishing the first RSSI value from the average of the applied averaging technique.

3. The method of claim 1, wherein:
   applying the handoff rule comprises:
      monitoring a number of transaction failures, a transaction failure comprising a failed attempt of the node to communicate with the first access point; and
   initiating handoff of the node to the second access point comprises:
      initiating handoff of the node to the second access point if the number of transaction failures satisfies a consecutive transaction failures threshold.

4. The method of claim 1, wherein:
   applying the handoff rule comprises:
      determining whether the first access point has one or more available slots to facilitate communication; and
   initiating handoff of the node to the second access point comprises:
      initiating handoff to a second access point if the first access point does not have one or more available slots.

5. The method of claim 1, wherein:
   applying the handoff rule comprises:
      determining a number of available slots the first access point has to facilitate communication;
      determining a number of available slots a second access point has to facilitate communication;
      comparing the number of available slots of the first access point to the number of available slots of the second access point; and
   initiating handoff of the node to the second access point comprises:
      initiating handoff to the second access point if the number of available slots of the second access point exceeds the number of available slots of the first access point.

6. A method for handing off a node from a first access point to a second access point, comprising:
   facilitating communication between a node and a network using a first access point;
   accessing a handoff rule of one or more handoff rules;
   determining one or more handoff factors associated with the first access point and a second access point, a handoff factor relevant in deciding whether to handoff from the first access point to the second access point;
   applying the handoff rule to the one or more handoff factors by:
      determining a first channel utilization value associated with the first access point;
      determining a second channel utilization value associated with the second access point; and
      determining a channel utilization difference between the first channel utilization value and the second channel utilization value; and
   initiating handoff of the node to the second access point if the channel utilization difference satisfies a channel utilization differential threshold, the channel utilization differential threshold comprising a first channel utilization differential threshold if the first channel utilization value is within a first range of values, the channel utilization differential threshold comprising a second channel utilization differential threshold if the first channel utilization value is within a second range of values, the first range of values less than the second range of values, the first channel utilization differential threshold greater than the second channel utilization differential threshold.

7. A system for handing off a node from a first access point to a second access point, comprising:
   a first access point operable to facilitate communication between a node and a network; and
   the node operable to:
      access a handoff rule of one or more handoff rules;
      determine one or more handoff factors associated with the first access point and a second access point, a handoff factor relevant in deciding whether to handoff from the first access point to the second access point;
      apply the handoff rule to the one or more handoff factors by:
         determining a difference between a first Received Signal Strength Indicator (RSSI) value and a second RSSI value, the first RSSI value associated with the first access point, the second RSSI value associated with the second access point; and
      initiate handoff of the node to the second access point if the one or more handoff factors satisfy the applied handoff rule by:
         initiating handoff of the node to the second access point if the difference satisfies an RSSI differential threshold, the RSSI differential threshold comprising a first RSSI differential threshold if the first RSSI value is within a first range of values, the RSSI differential threshold comprising a second RSSI differential threshold if the first RSSI value is within a second range of values, the first range of values less than the second range of values, the first RSSI differential threshold less than the second RSSI differential threshold.

8. The system of claim 7, the node further operable to:
   apply an averaging technique to a plurality of RSSI values;
   determine an average of the applied averaging technique; and
   establish the first RSSI value from the average of the applied averaging technique.

9. The system of claim 7, the node further operable to:
   monitor a number of transaction failures, a transaction failure comprising a failed attempt of the node to communicate with the first access point; and
   initiate handoff of the node to the second access point if the number of transaction failures satisfies a consecutive transaction failures threshold.

10. The system of claim 7, the node further operable to:
    determine whether the first access point has one or more available slots to facilitate communication; and
    initiate handoff to a second access point if the first access point does not have one or more available slots.

11. The system of claim 7, the node further operable to:
    determine a number of available slots the first access point has to facilitate communication;
    determine a number of available slots a second access point has to facilitate communication;
    compare the number of available slots of the first access point to the number of available slots of the second access point; and initiate handoff to the second access point if the number of available slots of the second access point exceeds the number of available slots of the first access point.

12. A system for handing off a node from a first access point to a second access point, comprising:
a first access point operable to facilitate communication between a node and a network; and
the node operable to:
access a handoff rule of one or more handoff rules;
determine one or more handoff factors associated with the first access point and a second access point, a handoff factor relevant in deciding whether to handoff from the first access point to the second access point;
apply the handoff rule to the one or more handoff factors by:
determining a first channel utilization value associated with the first access point;
determining a second channel utilization value associated with the second access point; and
determining a channel utilization difference between the first channel utilization value and the second channel utilization value; and
initiate handoff of the node to the second access point if the channel utilization difference satisfies a channel utilization differential threshold, the channel utilization differential threshold comprising a first channel utilization differential threshold if the first channel utilization value is within a first range of values, the channel utilization differential threshold comprising a second channel utilization differential threshold if the first channel utilization value is within a second range of values, the first range of values less than the second range of values, the first channel utilization differential threshold greater than the second channel utilization differential threshold.

13. A node of a communication network, comprising:
an interface operable to communicate with a first access point; and
a handoff initiator operable to:
access a handoff rule of one or more handoff rules;
determine one or more handoff factors associated with the first access point and a second access point, a handoff factor relevant in deciding whether to handoff from the first access point to the second access point;
apply the handoff rule to the one or more handoff factors by:
determining a difference between a first Received Signal Strength Indicator (RSSI) value and a second RSSI value, the first RSSI value associated with the first access point, the second RSSI value associated with the second access point; and
initiate handoff of the node to the second access point if the one or more handoff factors satisfy the applied handoff rule by:
initiating handoff of the node to the second access point if the difference satisfies an RSSI differential threshold, the RSSI differential threshold comprising a first RSSI differential threshold if the first RSSI value is within a first range of values, the RSSI differential threshold comprising a second RSSI differential threshold if the first RSSI value is within a second range of values, the first range of values less than the second range of values, the first RSSI differential threshold less than the second RSSI differential threshold.

14. The node of claim 13, the handoff initiator further operable to:
apply an averaging technique to a plurality of RSSI values;
determine an average of the applied averaging technique; and
establish the first RSSI value from the average of the applied averaging technique.

15. The node of claim 13, the handoff initiator further operable to:
monitor a number of transaction failures, a transaction failure comprising a failed attempt of the node to communicate with the first access point; and
initiate handoff of the node to the second access point if the number of transaction failures satisfies a consecutive transaction failures threshold.

16. The node of claim 13, the handoff initiator further operable to:
determine whether the first access point has one or more available slots to facilitate communication; and
initiate handoff to a second access point if the first access point does not have one or more available slots.

17. The node of claim 13, the handoff initiator further operable to:
determine a number of available slots the first access point has to facilitate communication;
determine a number of available slots a second access point has to facilitate communication;
compare the number of available slots of the first access point to the number of available slots of the second access point; and
initiate handoff to the second access point if the number of available slots of the second access point exceeds the number of available slots of the first access point.

18. A node of a communication network, comprising:
an interface operable to communicate with a first access point; and
a handoff initiator operable to:
access a handoff rule of one or more handoff rules;
determine one or more handoff factors associated with the first access point and a second access point, a handoff factor relevant in deciding whether to handoff from the first access point to the second access point;
apply the handoff rule to the one or more handoff factors by:
determining a first channel utilization value associated with the first access point;
determining a second channel utilization value associated with the second access point; and
determining a channel utilization difference between the first channel utilization value and the second channel utilization value; and
initiate handoff of the node to the second access point if the channel utilization difference satisfies a channel utilization differential threshold, the channel utilization differential threshold comprising a first channel utilization differential threshold if the first channel utilization value is within a first range of values, the channel utilization differential threshold comprising a second channel utilization differential threshold if the first channel utilization value is within a second range of values, the first range of values less than the second range of values, the first channel utilization differential threshold greater than the second channel utilization differential threshold.

19. A system for handing off node from a first access point to a second access point, comprising:
means for facilitating communicating between a node and a network using a first access point;

means for accessing a handoff rule of one or more handoff rules;

means for determining one or more handoff factors associated with the first access point and a second access point, a handoff factor revelant in deciding whether to handoff from the first access point to the second access point;

means for applying the handoff rule to the one or more handoff factors by:

determining a difference between a first Received Signal Strength Indicator (RSSI) value and a second RSSI value, the first RSSI value associated with the first access point, the second RSSI value associated with the second access point; and means for initiating handoff of the node to the second access point if the one or more handoff factors satisfy the applied handoff rule by:

initiating handoff of the node to the second access point if the difference satisfies an RSSI differential threshold, the RSSI differential threshold comprising a first RSSI differential threshold if the first RSSI value is within a first range of values, the RSSI differential threshold comprising a second RSSI differential threshold if the first RSSI value is within a second range of values, the first range of values less than the second range of values, the first RSSI differential threshold less than the second RSSI differential threshold.

* * * * *